Jan. 5, 1954     I. JEPSON     2,664,811
COFFEE MAKER
Filed Dec. 31, 1947     4 Sheets-Sheet 1
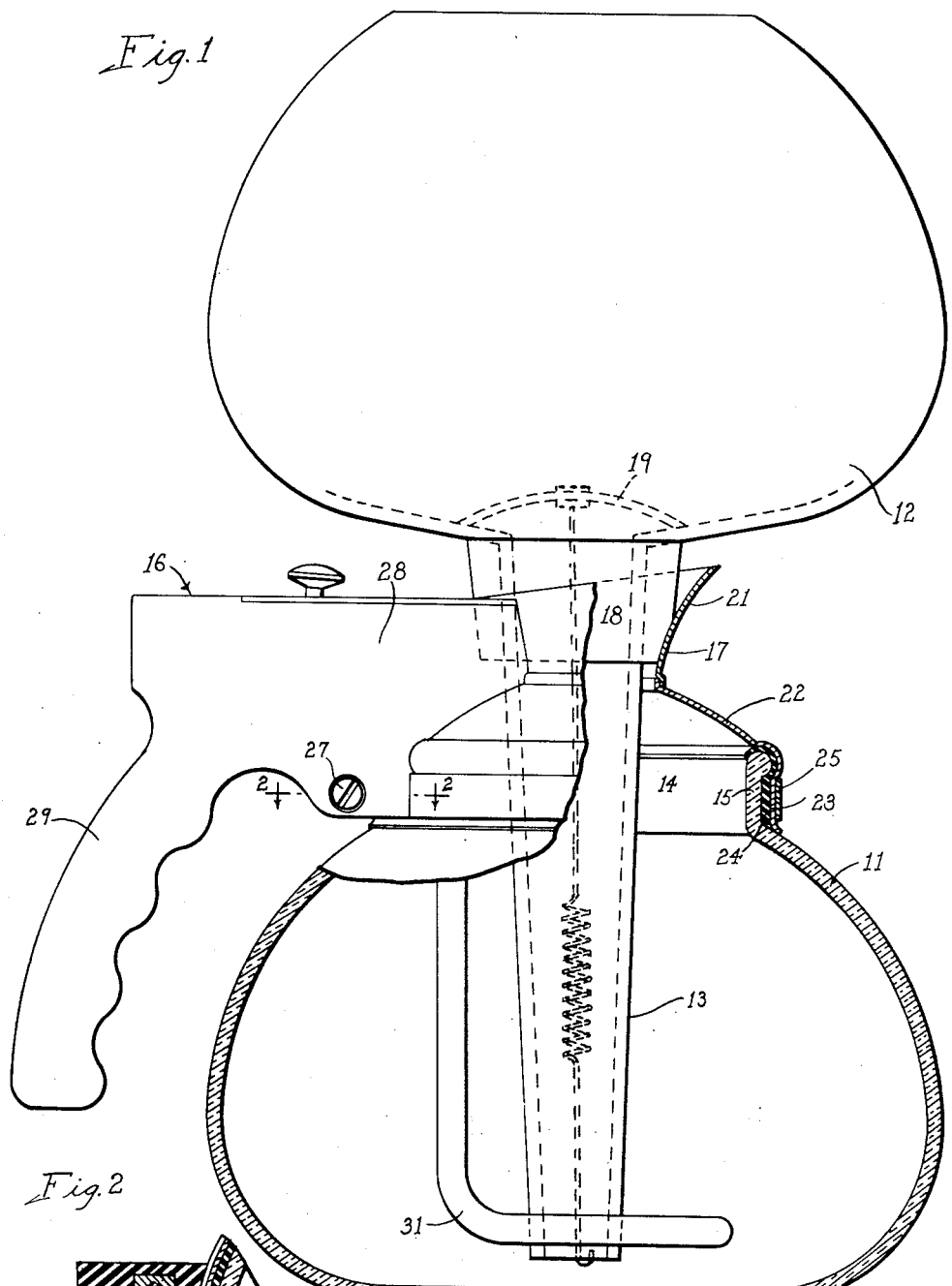
Inventor:
Ivar Jepson
By McCanna, Wintercorn & Horsbach
Attys.

Jan. 5, 1954          I. JEPSON          2,664,811
                      COFFEE MAKER
Filed Dec. 31, 1947                    4 Sheets-Sheet 2
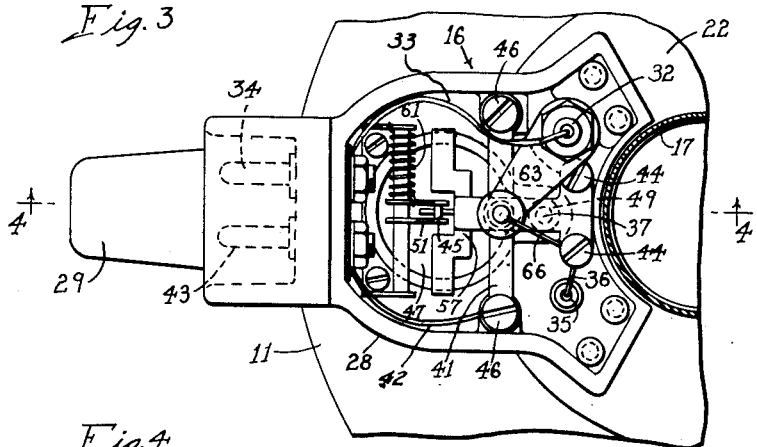
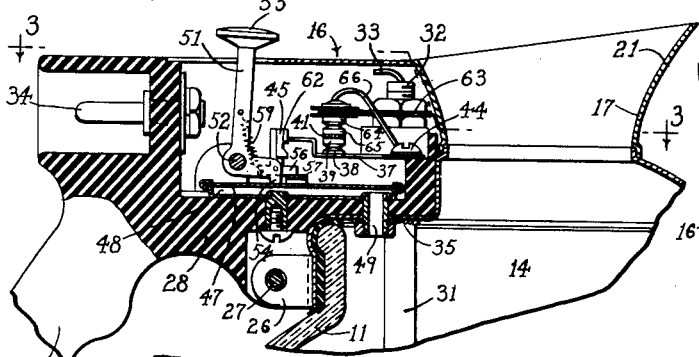
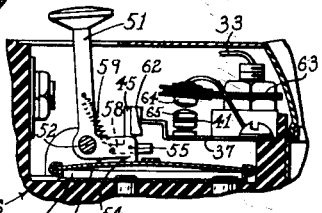
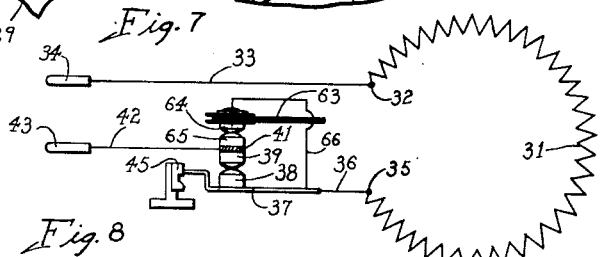
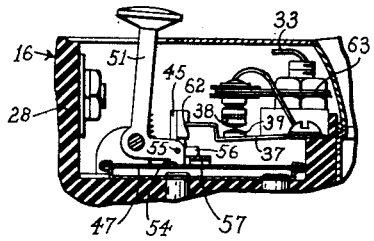
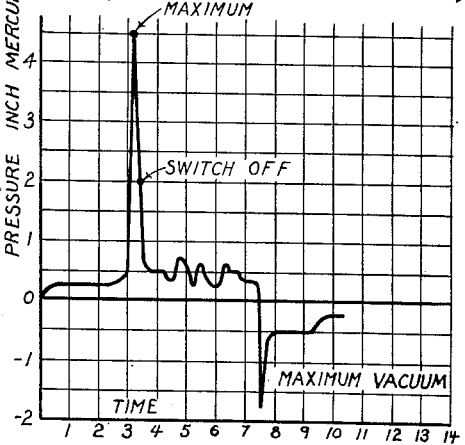

Jan. 5, 1954     I. JEPSON     2,664,811
COFFEE MAKER
Filed Dec. 31, 1947     4 Sheets-Sheet 3
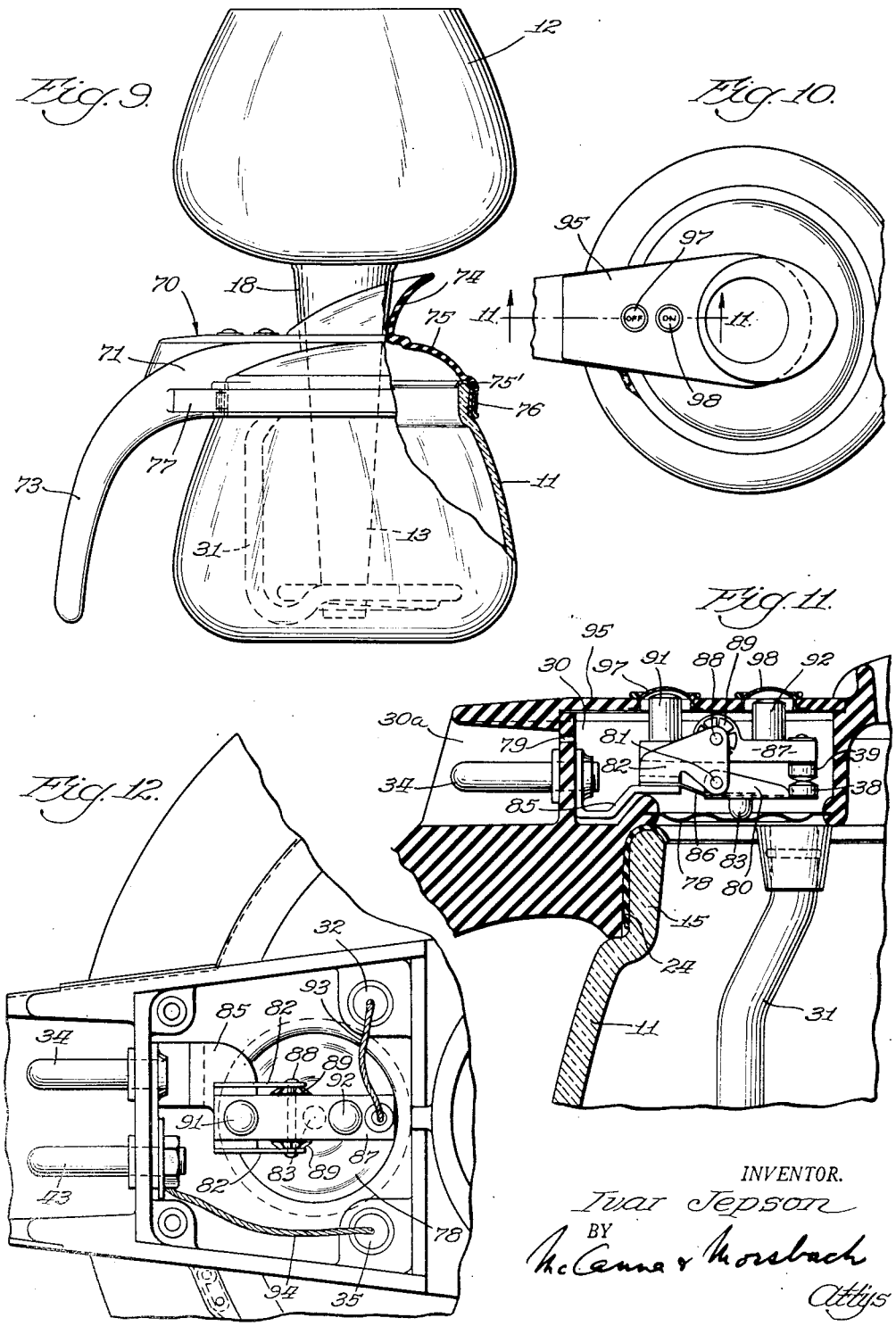
INVENTOR.
Ivar Jepson
BY
McCanna & Morsbach
Attys

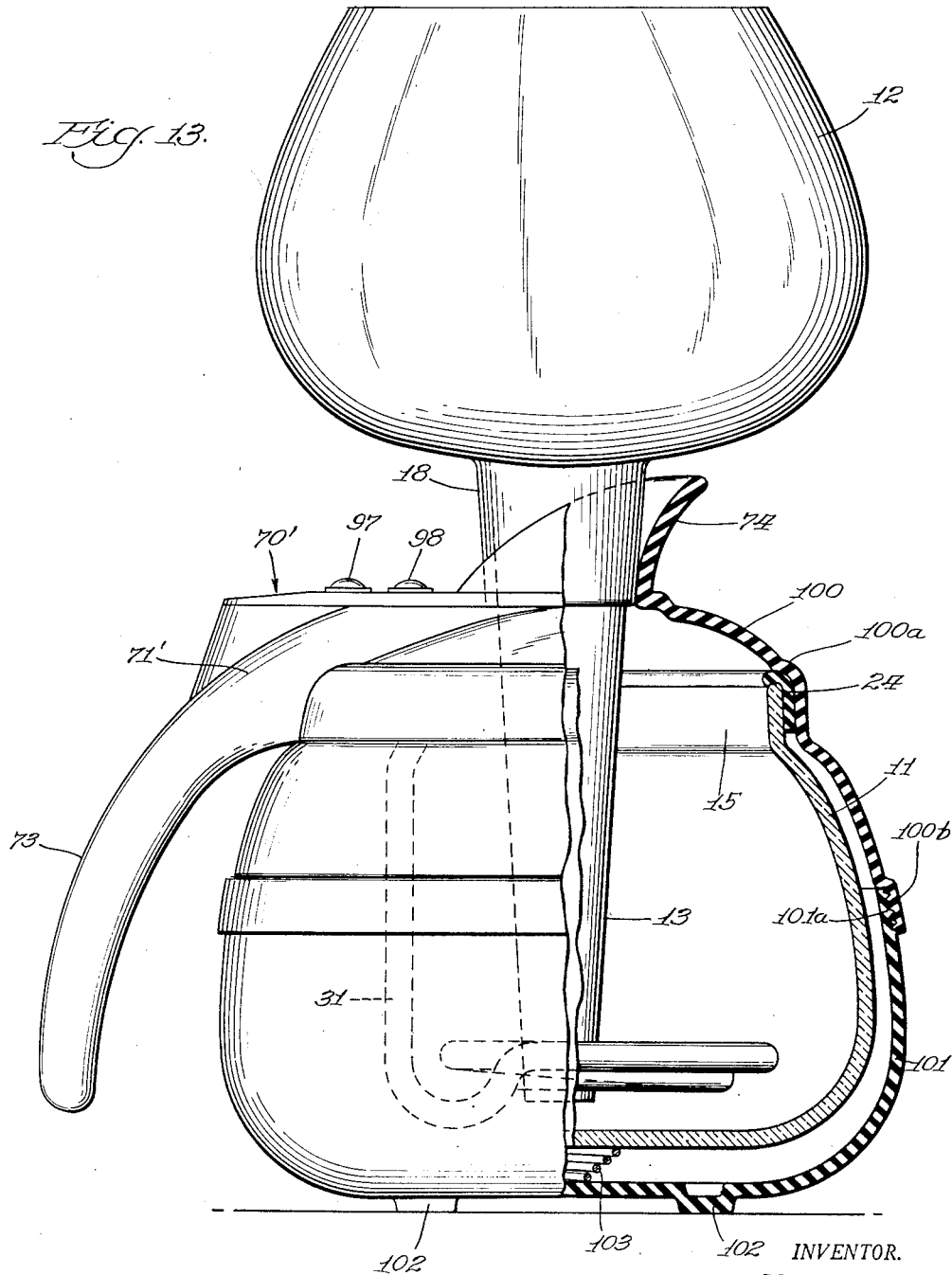

Patented Jan. 5, 1954

2,664,811

UNITED STATES PATENT OFFICE 2,664,811

COFFEE MAKER

Ivar Jepson, Oak Park, Ill., assignor to Sunbeam Corporation, Chicago, Ill., a corporation of Illinois Application December 31, 1947, Serial No. 794,959

13 Claims. (Cl. 99—281)

The present invention relates to automatic cooking devices and more particularly to beverage brewers and coffee makers of the type in which the heating means is automatically controlled during the coffee-making operation.

The present invention is a continuation in part of an application for Letters Patent of the United States, now abandoned, Serial No. 459,761 filed September 26, 1942, and assigned to the same assignee as the present application.

Beverage brewers and coffee makers of the so-called "vacuum type" have been extensively used in recent years. In general, this type of coffee maker has comprised a lower heating chamber and an upper coffee infusion chamber. Conventionally, water is placed in the lower heating chamber while the coffee grounds are placed in the upper chamber. As the water is heated in the lower chamber, water vapor pressure is created above the liquid in this chamber which, when the temperature approaches the boiling point of water, forces the water into the upper chamber to infuse the coffee grounds placed therein. When the heat is removed from the lower chamber it cools so that the water vapor contained therein condenses to create a vacuum, thereby causing the coffee to pass from the upper chamber through a suitable filter into the lower chamber where it may be maintained at a desirable temperature of the order of 180° F.

It will be understood that in automatic coffee makers of the type referred to above, it is essential that the heat supply to the heating chamber be cut off when the water has substantially all been forced into the upper chamber. If this cut-off action occurs too soon, substantially all of the water will not have been forced to the upper chamber and the coffee will be diluted by the water remaining in the lower chamber when the coffee returns to the lower chamber. On the other hand, if the cutoff action is delayed for any appreciable period of time after all the water is forced out of the lower chamber or vessel, damage or destruction of the coffee maker may result, particularly if the conventional glass vessels are employed. Actually, there are on the market today two types of automatic coffee makers of the general class referred to above. In one type the chambers are made of metal and the heating element is built into the bottom of the lower metal chamber. An example of this type of coffee maker is disclosed and claimed in United States Letter Patent 2,312,555 Jepson assigned to the same assignee as the present application. In this type of coffee maker, it will be understood that when substantially all of the water has been forced from the lower chamber, a very rapid increase in the temperature of the metal base will result and such rapid increase in the temperature of the base is utilized to actuate a thermostatically controlled switch for shutting off the heat at the proper time. Although this type of coffee maker operates very satisfactorily in every respect it does involve relatively expensive construction requiring accurate factory adjustment of the parts. It would be desirable to provide a satisfactory coffee maker of less expensive construction employing vessels of glass, plastic, or non-metallic materials, and control means which may be adjusted accurately in a simple manner.

The other type of coffee maker of the general class described above comprises vessels or chambers of glass together with an electrical heater which is incorporated in a separate stove-like unit. It is apparent at once that a difficult problem of control arises in this type of coffee maker because of the remote relationship of the electrical heater with respect to the interior of the lower water heating vessel. Numerous means of control have been employed with this second type of coffee maker where glass vessels are used. One common expedient has been to employ a float in the lower vessel which indicates the level of the water in the lower vessel, together with means to actuate a switch when the float has moved to its lowermost position. Such last mentioned means have been relatively complicated and have often comprised magnetic devices exerting electromagnetic forces through the glass container walls to perform a switch control function. Furthermore, such float control devices complicate the apparatus from the standpoint of washing and cleaning the same.

Other liquid level devices have also been suggested such, for example, as contacts which are normally bridged by the liquid in the lower vessel, and when the liquid falls to the desired low lever, the circuit is interrupted to permit a control operation. Such apparatus provides a positive control but, unfortunately, the conductivity of the water is not sufficiently good in all localities to produce the desired control operation.

Pressure responsive devices have also been suggested whereby when the pressure in the lower vessel has reached a predetermined high value, the heating device is rendered ineffective. Unfortunately, such pressure responsive devices have not been positive in operation heretofore so as to shut off the heating device substantially when all of the water has been removed from the lower vessel. Such pressure responsive devices have been set for a predetermined pressure, such, for example, as a pressure of 2½ inches of mercury. When the coffee maker is employed to make a large quantity of coffee, such as eight cups, for example, this pressure might be attained long before all of the water has been removed from the lower vessel. On the other hand, if the coffee maker is employed to make only two cups of coffee, for example, this pressure might never be attained so that the pressure responsive device would never operate to shut off the heat. In addition to the variations in the amount of coffee which is made with the coffee maker, such pressure responsive devices would also be effected by the voltage regulation of the source of electrical energy employed, whereupon the operating pressure might be reached too soon or never be reached, depending upon whether there is an under or an over voltage condition.

It would desirable to provide an automatic coffee maker which was relatively inexpensive and yet which would include means for automatically controlling the heating device at the desired time under all conditions of operation without employing the complicated float control and similar devices employed heretofore. It would, furthermore, be desirable to provide an automatic coffee maker of the glass type which would not require the separate stove-like unit which prior art devices employed.

It has been discovered that during a coffee-making operation of the coffee maker of the type referred to above, the pressure in the lower vessel rises first slowly and then more rapidly to a maximum value, which maximum value may vary widely under various conditions. It has furthermore been discovered that when the water has substantially all been moved to the upper vessel so as to uncover the tube depending into the lower vessel, a fairly rapid drop in pressure results. The present invention is primarily concerned with the provision of a positive pressure responsive means for controlling an automatic coffee maker in which the pressure responsive means operates directly in response to a decrease in pressure in the lower vessel following the attainment of a maximum pressure therein. With the present arrangement, as will become apparent from the following description, it is substantially immaterial as to what the value of the maximum pressure should be in any case since the device is responsive to a decrease in pressure.

Accordingly, it is an object of the present invention to provide a new and improved automatic coffee maker.

It is another object of the present invention to provide a coffee maker of the so-called "vacuum type" in which the heating device is rendered ineffective when substantially all of the liquid in the lower vessel has been displaced to the upper vessel, which result is accomplished with simple control means, inexpensive to make, foolproof in operation, and satisfactory in every respect.

Another object of the present invention is to provide an automatic coffee maker in which automatic control means responsive to a decrease in pressure following the attainment of a maximum pressure in the water heating chamber is employed to control automatically the heating means.

Still another object of the present invention is to provide in a coffee maker a novel unit of assembly connected by a supporting structure adapted to be applied to the lower vessel and equipped with an immersion heater depending into the vessel through the open top thereof, together with improved means for controlling the operation of the immersion heater.

A further object of the present invention comprises the provision in an automatic coffee maker of a pair of glass vessels together with a unitary assembly including all of the control and heating mechanisms as well as the apparatus for relating the two vessels during a coffee-making operation.

It is another object of the present invention to provide an assembly unit embodying a pressure responsive device, a switch device, and a heater unit for detachable application to the open top of a glass heating vessel which comprises all of the control mechanism for an automatic coffee maker.

A further object of the present invention is to provide an improved inexpensive coffee making vessel for an automatic coffee maker.

Further objects and advantages of the present invention will become apparent as the following description proceeds and the features of novelty which characterize the invention, will be pointed out with particularity in the claims annexed to and forming a part of this specification.

For a better understanding of the present invention, reference may be had to the accompanying drawings in which:

Fig. 1 is a side elevational view partly in section of a "vacuum type" automatic coffee maker embodying the present invention;

Fig. 2 is a fragmentary sectional view taken on line 2—2 of Fig. 1;

Fig. 3 is a view looking downward with reference to the lower vessel and taken substantially along the line 3—3 of Fig. 4.

Fig. 4 is a sectional view taken on line 4—4 of Fig. 3 and assuming that Fig. 3 shows the complete structure;

Figs. 5 and 6 are partial views of Fig. 4 showing different control positions of the control mechanism associated therewith;

Fig. 7 is a schematic diagram of the electric control circuit of the automatic coffee maker of the present invention;

Fig. 8 is a graph or curve diagram showing the internal pressure in the lower vessel with reference to time during a coffee making operation to aid in understanding the operation of the automatic coffee maker of the present invention;

Fig. 9 is an elevational view similar to Fig. 1 showing another embodiment of the present invention;

Fig. 10 is a top partial view of the lower vessel of Fig. 9;

Fig. 11 is a partial sectional view taken on line 11—11 of Fig. 10;

Fig. 12 is a partial view somewhat similar to Fig. 3 of the coffee maker of Fig. 9; and Fig. 13 is an elevational view partly in section of a modified construction embodying the present invention.

Although the present invention is illustrated in the drawings specifically as applied to an automatic coffee maker of the vacuum type it should be understood that the invention is applicable to other types of coffee makers as well as other cooking devices wherein a cooking operation may be controlled in the manner contemplated by the present invention.

Referring now to the embodiment of the present invention illustrated in Figs. 1 to 7 inclusive of the drawings where like parts are designated by the same reference numerals there is illustrated a coffee maker comprising a lower water heating chamber or vessel 11 and an upper coffee infusion chamber or vessel 12. Preferably these vessels are made of glass although any other suitable material might be employed. The chamber 12 is provided with the conventional depending tube 13, which is adapted to be inserted into the lower vessel 11 as illustrated in Fig. 1 of the drawings to provide communication between the vessels 11 and 12. This tube 13 may be provided with a suitable opening 13a such as is disclosed in Fig. 1 of Jepson Patent 2,312,555 assigned to the same assignee as the present invention to permit a predetermined heating of the water in the vessel 11 before the water is forced into the vessel 12. As illustrated the lower vessel 11 has an open top 14 defined by an upright flange 15. In accordance with one aspect of the present invention there is provided a unit of assembly generally designated at 16 which unit and the two vessels 11 and 12 effectively comprise the entire coffee maker. This unit of assembly 16 includes an upwardly extending annular flange 17 which is adapted to receive a resilient sealing ring 18 which fits over the tube 13 adjacent the bottom of the vessel 12 when the vessels are assembled in the manner shown in Fig. 1 of the drawings. With this arrangement the vessels are related in sealed relationship with a means of communication provided therebetween. Preferably the annular flange 17 which provides a seat for the resilient sealing ring 18 includes a deformed portion 21 which defines a suitable pouring spout for the lower vessel.

As illustrated the upper vessel 12 is provided with a suitable filter or strainer 19 disposed in the bottom thereof so as to retain the ground coffee which is placed therein, thus preventing the coffee grounds from entering the depending tube 13. To hold the strainer or filter 19 in the position shown there preferably is provided a coiled spring arrangement 19a having one end fastened to the strainer 19 while the other end is hooked around the lower end of the depending tube 13. With this arrangement the filter 19 is readily removable for the purpose of cleaning the upper vessel and washing the same.

To removably relate the unit of assembly 16 to the lower vessel 11, the unit of assembly 16 includes a cover shaped member 22 which depends from the seat portion 17. This cover shaped portion 22 comprises a depending flange 23 adapted to fit over the upstanding flange 15 of the vessel 11. A suitable resilient gasket 24 is interposed between the flanges 15 and 23 to provide an effective seal therebetween. The resilient gasket 24 preferably includes a lip which extends around the upper surface of the flange 15 to maintain the same in proper position and to protect the upper portion of the lower vessel 11. The unit 16 further includes a casing or body portion 28 preferably formed of insulating material and including a downwardly extending portion which defines a depending handle 29. In order to relate the body portion 28, the cover member 22, and the vessel 11 there is provided a suitable flexible band 25 of metal or the like adapted to be applied to the outside of the flange 23 as is best shown in Figs. 1 and 2 of the drawings. One end 26 of the band 25 is adapted to be suitably fastened within a recess defined in the casing or body portion 28 while the other end is adapted to be tightened by a screw 27 to clamp the flange 23 tightly in position. When this clamping operation is performed the unit of assembly 16 effectively is united to the vessel 11 and the depending handle 29 serves either to carry the entire coffee maker as assembled in Fig. 1 of the drawings or for carrying only the lower vessel and for pouring coffee from the spout 21 when the upper vessel is removed.

As was mentioned above it is desired to provide an automatic coffee maker having a simplified construction whereby the vessels 11 and 12 and the unit of assembly 16 substantially comprise the entire coffee maker. With this arrangement the separate stove unit employed heretofore is entirely dispensed with. In order to heat water which is placed in the lower vessel 11 there is provided in accordance with the present invention an immersion type heater 31 which extends downwardly through the mouth 14 of the lower vessel 11 to a level closely adjacent the bottom of the vessel for heating the water as a step in the coffee making operation and also if desired for subsequently maintaining the coffee at a predetermined temperature after it has been returned to the lower vessel 11. As illustrated the immersion heater 31 is preferably a sheathed type of heating unit, with the terminals thereof respectively designated at 32 and 35, best shown in Figs. 3 and 7 of the drawings. The heating unit 31 is physically supported from the unit of assembly 16 and the terminals 32 and 35 thereof are disposed within a suitable control mechanism chamber defined by a recess 30 in the body or casing 28. It will be understood that an automatic control operation necessitates controlling the current supply to the immersion heater 31 from a suitable source of electrical energy which preferably is connected to the pin type contacts 34 and 43 disposed within a recess 30a defined within the body or casing 28. As illustrated the terminal 32 of the immersion heater 31 is connected by a conductor 33 directly to the pin terminal 34 while the other terminal 35 of the immersion heater 31 is connected by a conductor 36 to the fixed end of a spring strip 37 mounted within the recess 30. The spring strip 37 has a free end upon which is mounted a contact 38 adapted for engagement with a fixed contact 39 which is supported from a stationary conductor bar 41 extending across the recess 30 and fastened to the body 28 by screws 46 at either end thereof. The fixed conductor bar 41 is connected by a conductor 42 with the terminal pin 43. The terminal pins 34 and 43 are male or bayonet type contacts adapted to engage with a suitable socket contact associated with the well-known power cord extensively used with most types of home appliances. From the above description it will be apparent that the electrical circuit for the heating element 31 best shown in Fig. 7 of the drawings includes a switch having a stationary contact 39 and the movable contact 38. The spring strip 37 is preferably supported from the body 28 at its fixed end by suitable screws 44.

As was mentioned above, it would be desirable to provide in an automatic coffee maker of the type described thus far, suitable control means for actuating the switch comprising the contacts 38 and 39 to the open position at the instant during the coffee making operation when substantially all of the water in the lower water vessel 11 has moved by pressure created in the lower vessel 11 to the upper vessel or chamber 12. In Fig. 8 of the drawings there is illustrated a curve diagram showing the pressure conditions in the lower vessel 11 of a coffee maker during the coffee making operation, assuming that the switch comprising the contacts 38 and 39 is actuated to the open position at the instant marked "switch off" in Fig. 8 of the drawings. It should be understood that the curve diagram of Fig. 8 is intended merely for purposes of illustration since, as will become apparent from the following description, a substantial variation in this curve will occur depending upon certain variable factors such as the number of cups of coffee which are being made as well as the voltage regulation of the source of electrical energy is connected to the terminals 34 and 43. Assuming that the source of electrical energy is connected to the pin type terminals 34 and 43 at the instant of time indicated as zero time in Fig. 8 of the drawings then the pressure in the vessel 11 gradually increases. This pressure is generated in the vessel as the result of the water vapor produced with the increase in temperature and this pressure reaches a maximum at about the time the water in the lower vessel reaches the lower end of the tube 13. It has been discovered that when this maximum pressure is obtained the pressure drops quite rapidly and if the switch were actuated to the open position at the point marked "switch-off" in Fig. 8 the pressure would continue to decrease following which a vacuum would be produced in the lower vessel as was mentioned above whereupon the coffee produced in the upper vessel 12 would be returned to the lower vessel. It has been discovered that the maximum pressure obtained during a coffee-making operation varies widely depending upon the number of cups of coffee which it is desired to make and the following table sets forth test data obtained with a typical coffee maker of the vacuum type.

| Number of Cups | Maximum Pressure Attained in the Lower Vessel | Pressure at Which Switch Is Opened | Maximum Vacuum Produced in Lower Vessel 11 |
| --- | --- | --- | --- |
| 2 cups | 1.8" of Mercury | 0.3" of Mercury | −1.6" of Mercury. |
| 4 cups | 2.6" of Mercury | 0.2" of Mercury | −2.5" of Mercury. |
| 6 cups | 2.7" of Mercury | 0.3" of Mercury | −2.2" of Mercury. |
| 8 cups | 3.0" of Mercury | 0.4" of Mercury | −2.5" of Mercury. |

From the above table it is apparent that a pressure responsive device set to operate at a predetermined pressure would be entirely unsatisfactory to control the coffee-making operation. For example if the pressure responsive device were set to operate when the pressure reached 1.8" of mercury then satisfactory operation would be obtained for making two cups of coffee but this pressure would be attained, when making more than two cups, long before all of the water in the lower vessel had been displaced so that obviously a much diluted and unsatisfactory brew would be obtained. On the other hand if the pressure responsive device were set to operate at 3 inches of mercury then satisfactory operation would be obtained when 8 cups of coffee were made, but when less than 8 cups of coffee were made this pressure would never be obtained and the switch comprising the contacts 38 and 39 would never open so that the lower coffee vessel 11 might be destroyed particularly when made of glass. Because of this non-positive operation pressure responsive devices prior to the present invention have been found unsatisfactory and have not been employed in commercial coffee makers. I have discovered however that if a pressure responsive device were employed to operate the switch comprising the contacts 38 and 39 in response to a decrease in pressure, following the attainment of a maximum pressure which might vary considerably, then positive and satisfactory operation would be obtained in all cases, since the pressure drop when the water reaches the lower end of the tube 13 is quite rapid and the above table indicates that the pressure existing at a satisfactory switch off point is very similar regardless of the number of cups of coffee which are being brewed.

In accordance with the embodiment of the invention illustrated in Figs. 1 to 7 of the drawings a pressure responsive mechanism is provided for opening the switch comprising the contacts 38 and 39 in response to a predetermined decrease in pressure following the attainment of a maximum pressure. Accordingly there is illustrated a pressure responsive means which may comprise any suitable device such as a Sylphon bellows or the like and which has been indicated in the drawings as a diaphragm 47 mounted so as to be responsive to the pressure within the lower vessel 11. As illustrated the diaphragm 47 is positioned near the bottom of the recess 30 defined in the unit 16 and is arranged so as to be subjected on one side to the pressure within the vessel 11 which is communicated thereto through the passage 49. Preferably the diaphragm 47 is stretched across a cup-shaped member which defines a pressure chamber 48 connected by the passageway 49 with the interior of the lower vessel 11. The other side of the diaphragm is subjected to atmospheric pressure.

In order that a decrease in pressure following an increase in pressure to a maximum will cause the switch comprising contacts 38 and 39 to open, there is mounted for engagement with the surface of the diaphragm 47 remote from the pressure chamber 48 a latching member 45 having a notch 62 defined therein engageable with an extension of the spring member 37. The notch 62 preferably has a square shoulder at its upper end and a beveled face near its lower end. When the diaphragm 47 is in its undistorted condition as shown in Fig. 4 of the drawings the notch 62 of the latch member 45 is out of engagement with the end of the spring member 37. However upon an increase in pressure the diaphragm 47 is distorted in the manner shown in Fig. 5 of the drawings to cause upward movement of the latch member 45 whereupon the notch 62 engages the end of the spring lever 37. If downward movement of the diaphragm 47 causes downward movement of the latch member 45, it will be apparent that a subsequent decrease in pressure permitting the diaphragm 47 which is inherently biased to its normal position shown in Figs. 4 and 6 to return to such normal position, then the spring lever 37 which is in engagement with the square shoulder of the notch 62 is moved downwardly so as to move the contact 38 out of engagement with the fixed or stationary contact 39, thereby effectively interrupting the current flow to the immersion heater 31.

In order to mount the latch member 45 so as to move in both directions with movement of the diaphragm 47 there is provided a bell crank lever 51 pivotally mounted on a rod 52 suitably supported within the recess 30 of the body or casing 28. The bell crank 51 is illustrated as having duplicate arms spaced apart so as to provide means therebetween for pivotally supporting the latch member 45 as indicated by the pivot point 55. The upwardly extending arms of the bell crank 51 are attached to a suitable finger manipulating knob 53 extending through a suitable slot in a cover member 50 for the recess 30. The arms of the bell crank 51 to which the latch 45 is pivotally mounted comprise an extension or abutment 54 adapted to engage the top of the diaphragm 47. A suitable spring 61 associated with the shaft 52 for supporting the bell crank 51 constantly urges the abutment 54 against the diaphragm 47 thereby insuring movement of the latch 45 with the diaphragm 47. The latch member 45 is provided with a forwardly extending arm 56 and a rearwardly extending arm 58. The forwardly extending arm 56 is adapted to engage a fixed stop 57 located just above the diaphragm 47 and supported outside the boundaries of the diaphagm 47 as indicated in Fig. 3 of the drawings. The rearwardly extending arm 58 of the latch 45 is connected by a suitable tension spring 59 to a portion of the bell crank 51 so as to constantly urge the latch member in a clockwise direction about its pivot 55 as viewed in Fig. 4 of the drawings. It will be apparent that the spring 61 causes the abutment 54 to remain in contact with the diaphragm 47. The spring 59 furthermore will tend to bias the latch 45 into engagement with the spring arm 37. During the coffee making operation the diaphragm is distorted to the position shown in Fig. 5 of the drawings so that the notch 62 engages the end of the spring arm 37. Upon the completion of the coffee making operation the parts of the control mechanism are as shown in Fig. 6 of the drawings and the function of the control knob 53 is to cause resetting of the switch comprising the contacts 38 and 39 by moving the notch 62 relative to the end of the spring arm 37. This is accomplished by manipulating the knob 53 to cause slight clockwise rotation of the bell crank 51 as viewed in Fig. 6 of the drawings. This causes downward movement of the pivot point 55 of the latch 45 and since the forwardly extending portion 56 cannot move downwardly by virtue of the stop 57, the latch 45 is pivoted in a counterclockwise direction about its pivot 55 to release the end of the spring arm 37 and permit contact 38 to move into contacting engagement with stationary contact 39 thereby closing the circuit through the heating element 31 for the initiation of a subsequent coffee making operation.

It is often desirable at the completion of the coffee-making operation to maintain the coffee which is then disposed in the lower vessel 11 at a suitable temperature of the order of 180° F. or thereabouts. In order to accomplish this there is provided a thermostatically controlled switch connected in parallel with the switch comprising the contacts 38 and 39. This control means is illustrated as comprising a bimetallic strip 63 having one end thereof suitably supported within the recess 30 while the other end supports a movable contact 64 engageable with a stationary contact 65 supported by the member 41 and electrically connected with the stationary contact 39. The contact 64 is suitably insulated from the bimetallic strip 63 and is effectively connected by a conductor 66 to the terminal 35 of the heating element 31. As illustrated the conductor 66 is connected to the screw 44 which in turn is connected by the conductor 36 with the terminal 35. The contacts 64 and 65 thereby provide a switch which parallels the switch defined by the contacts 38 and 39. The bimetallic element 63 is designed to cause opening of the switch comprising the contacts 64 and 65 at temperatures in the neighborhood of 180° F. It will be apparent that during the coffee making operation the switch comprising the contacts 64 and 65 will open when the temperature exceeds 180° as is indicated by Fig. 5 of the drawings and this switch comprising the contacts 64 and 65 remains open until the temperature has been reduced to approximately 180°. At the completion of the coffee making operation when the contacts 38 and 39 are separated as indicated by Fig. 6 of the drawings the bimetallic element 63 will open and close the heating circuit as the temperature of the coffee increases and decreases thereby maintaining the coffee at the desired degree of temperature for serving. It will be apparent that the control provided by the bimetallic element 63 in no way disturbs the operation of the pressure responsive control means described above.

It will be understood that the recurrent operation of the switch comprising the contacts 64 and 65 will continue so long as the power cord is connected to the pin type contacts 34 and 43 or in other words so long as the coffee maker is plugged into the current supply.

In view of the detailed discussion included above the operation of the coffee maker of the present invention will be readily understood by those skilled in the art. Briefly however any desired quantity of water commensurate with the amount of coffee to be made is placed in the lower vessel 11 and coffee grounds also commensurate with the amount of coffee to be made are placed in the upper vessel 12. The coffee maker is connected to a suitable electrical outlet when the knob 53 is actuated to rotate the bell crank 51 in clockwise direction as viewed in Fig. 4 with the resultant lowering of the pivot point 55 and swinging of the latch member 45 in a counterclockwise direction to free the notch 62 from the end of the spring strip 37. This action permits the contact 38 to move into engagement with the contact 39 to close the heater circuit. Under these conditions the parts assume the positions indicated in Figs. 4 and 7 of the drawings. It will be apparent that the current flowing through the immersion heater 31 causes the water to be heated with the result that the production of a water vapor pressure within the vessel 11 somewhat in accordance with the curve shown in Fig. 8 of the drawings occurs. As the pressure rises the water is forced from the lower vessel 11 through the depending tube 13 into the upper vessel 12 and a maximum pressure is reached at the time the water level in the lower vessel reaches the lower end of the depending tube 13 when a rather rapid decrease in pressure occurs. The diaphragm 47 responds to this increase in pressure so as to move the bell crank 51 in a counterclockwise direction and the latch member 45 upwardly so that the notch 62 therein engages the end of the spring strip 37. This position of the mechanism parts is indicated by Fig. 5 of the drawings which also shows that the temperature is sufficiently high so that the thermostatically controlled switch comprising the contacts 64 and 65 is open. Such increase in pressure to distort the diaphragm 57 does not disturb the contacts 38 and 39 which remain closed. The maximum pressure which is attained during the coffee making operation may vary widely with the result that for very high maximum pressures the latch 45 may move so that the notch 62 overrides the end of the spring strip 37 whose upward movement is limited by the contact 39. Immediately following the attainment of such maximum pressure point the water vapor or steam pressure in the lower vessel 11 escapes through the tube 13 with the resultant sudden pressure drop in the lower vessel 11 substantially as indicated in Fig. 8 of the drawings. This sudden drop in pressure causes the diaphragm 47 to move to the position shown in Fig. 6 of the drawings. Under the influence of the spring 61 the latch 45 also moves downwardly and with it moves spring member 37 to open the switch comprising contacts 38 and 39 with the resultant deenergization of the heater circuit 31. The control structure may be arranged to open the heater circuit at any desired point as an incident to this sudden drop or decrease of pressure within the vessel 11 which point is designated as the "switch-off" point in Fig. 8 of the drawings. At this step the coffee liquid is brewing in the upper vessel. This brews as the lower vessel cools and as a consequence of the vacuum which forms in the lower vessel the liquid will pass through the filter 19 into the lower vessel 11 as is well known in the coffee-making art. This completes the coffee-making operation and the thermostatic control switch comprising the contacts 64 and 65 will maintain the coffee in the lower vessel hot at the desired temperature for serving until the coffee maker is disconnected from the power supply. With the above described arrangement the switch off point occurs at a predetermined pressure under all conditions. Consequently, it is necessary for satisfactory operation that the switch off point occurs at a lower pressure than the lowest maximum pressure likely to occur.

It will be understood that other suitable mechanisms for operating the control switch in response to a decrease in pressure following the attainment of a maximum pressure will readily suggest themselves to those skilled in the art. For example instead of employing the mechanical latch 45 a permanent magnet might be employed which moves toward an armature fastened to the end of the spring arm 37 when the diaphragm 47 is distorted by pressure, so that subsequent downward movement of the diaphragm 47 will move the armature, which is now within the coercive range of the magnet, and consequently the spring arm 37.

A preferred embodiment of the present invention is illustrated in Figs. 9 to 12 of the drawings where the corresponding parts thereof are designated by the same reference numerals. In this preferred embodiment the switch-off point occurs automatically in response to a predetermined decrease in pressure from the maximum pressure attained, and the magnitude of this maximum pressure may have any reasonable value. The switch-off point therefor does not occur at the same predetermined pressure, but rather at the same predetermined decrease from the maximum. The vessels 11 and 12 and in fact everything except the unit of assembly which is designated by the reference numeral 70 in Fig. 9 of the drawings may be identical with the ararngement described heretofore. In this arrangement the unit of assembly 70 includes the body portion 71 very similar to the body portion 28 referred to above which terminates in a depending handle 73. However the outwardly extending sealing flange 17 and the cover member 22 of the coffee maker described above are eliminated and instead the body portion 71 has integrally formed therewith a suitable molded insulating material, the portion 74 of which defines the member for sealing engagement with the resilient member 18 as well as the pouring spout, and the portion 75 which provides the cover member adapted to extend over the upstanding flange 15 and the resilient gasket member 24. It will be understood that such a cover member is sufficiently resilient to be capable of being slipped over the upstanding flange 15. For the purpose of relating the cover member 75 which is an integral part of the body 71 to the vessel 11, there is provided a suitable metal band 76 disposed in a recess formed in the depending flange 75' of the cover member 75. This band 76 is fastened at one end to the body member 71 and at the other end to an over center type member 77 so that manipulation of the member 77 will tighten or release the band 76 and consequently fasten or remove the unit assembly 70 with reference to the container 11.

As in the construction described above the body or casing 71 is provided with a recess 30 for the control mechanism and a recess 30a for the pin type contacts 34 and 43 respectively.

Disposed near the bottom of the recess 30 is a pressure responsive device in the form of a diaphragm 78 whose lower surface is directly responsive to the pressure within the vessel 11. The upper surface of the diaphragm 78 is subjected to atmospheric pressure by virtue of a vent 79 connecting the interior of the recess 30 to atmosphere. This diaphragm 78 has its periphery sealed into a circumferential recess defined in the body portion 71 whereby the diaphragm 78 is effectively an integral portion of the body or casing 71. In order to control the coffee making operation the switch comprising the contacts 38 and 39 is disposed within the recess 30. As illustrated the contact 38 is supported on a lever 80 pivotally mounted at 81 to suitable bifurcated supporting means 82 mounted within the recess 30. The member 80 furthermore is provided with a projection 83 which is in engagement with the face of the diaphragm 78 remote from the vessel 11. The lever 80 is furthermore biased by means of a conducting flat spring member 86 so that the extension 83 is always in engagement with the diaphragm 78. As is best shown in Figs. 11 and 12 of the drawings the contact 38 is connected to the pin type terminal 34 through a suitable conductor 85, and the spring 86 which is connected to the lever 80, which lever is preferably formed of conducting material. The projection 83 from the lever 80 is preferably formed of an insulating material.

The contact 39 is supported on a lever 87 also pivotally mounted as indicated at 88 between the two portions of the bifurcated support 82. A pair of friction washers 89 are disposed between the bifurcated portions 82 and the lever 87, which lever 87 is preferably formed of insulating material. As illustrated the lever 87 has an extension to the opposite side of the pivot 88 from the contact 39 which supports an upwardly extending member 91. The portion of the lever 87 to the right of the pivot 88 as viewed in Fig. 11 also has an upwardly extending member 92. The purpose of the members 91 and 92 will become apparent as the following description proceeds. To complete the electrical circuit through the switch comprising the contacts 38 and 39 the contact 39 is connected by means of a conductor 93 with the terminal 32 of the heating element 31. The terminal 35 on the other hand of the heating element 31 is connected directly by the conductor 94 with the pin type contact 43.

With the arrangement described and the contacts 38 and 39 in the closed position shown in Fig. 11 of the drawings the coffee making operation will proceed in the same manner as was described in connection with the arrangement shown in Figs. 1 to 7 of the drawings. As the pressure in the lower vessel 11 increases the diaphragm 78 is bowed upwardly with the result that the contact 38 is moved upwardly through pivotal movement of the lever 80. Since the contact 39 is mounted on a pivoted arm 87 it also moves upwardly but remains in conducting relationship with the contact 38. When the maximum pressure has been obtained resulting in the maximum upward movement of the contact 38 there follows the subsequent decrease in pressure discussed above so that diaphragm 78 returns to the position shown in Fig. 11 of the drawings and spring 86 causes contact 38 to move to its lowermost position. However the friction washers 89 described above hold the lever 87 in the uppermost position attained thereby so that contact 38 moves away from contact 39 to open the circuit in the same manner as was accomplished in the previously described embodiment, except that the circuit is open following a predetermined decrease from the maximum rather than a decrease to a predetermined pressure.

The projection 92 is effectively a "reset" button or "On" button since by pushing downwardly on this button the lever 87 is moved about its pivot 88 and the contact 39 is moved into engagement with the contact 38 to close the heating circuit. The projection 91 on the other hand is effectively an "Off" button since by pushing downwardly on this button the switch comprising the contacts 38 and 39 is opened thereby permitting manual control of the coffee maker if it is desired. In accordance with the present invention the recess 30 except for the vent 79 is completely enclosed by a cover member 95 which may even be integral with the body or casing 71 if desired. This cover member 95 is provided with a pair of openings for the projections 91 and 92 which are preferably closed by suitable resilient plugs or sealing gaskets 97 and 98 respectively, best shown in Fig. 11 of the drawings. These plugs may be distorted to actuate the buttons 91 and 92 without displacing them from their position closing the openings in the cover member 95. Preferably the sealing members 97 and 98 are provided with suitable indicia such as "Off" and "On" respectively to indicate the function of the particular control button which is actuated by pressing on the resilient sealing members 97 and 98.

It will be apparent that a very simple control device is provided in the embodiment shown in Figs. 9 to 12 inclusive which employs a pressure responsive device responsive to a predetermined decrease in pressure from the maximum following the attainment of a maximum pressure. It should be understood that if desired a suitable control means for maintaining hot the coffee in the lower vessel following the completion of the coffee making operation may be incorporated, which may take the form shown in connection with the first described embodiment of the present invention.

In view of the detailed description included above the operation of the coffee maker of the preferred embodiment of the present invention will be apparent and no further discussion thereof is included herewith. It will furthermore be understood that there has been provided a simple type of coffee maker employing a pressure responsive device which is fool proof in operation and unlike the prior art pressure responsive devices employed in coffee makers insures proper control of the coffee making operation regardless of the variables involved.

There are some people who feel that coffee should only be made in a glass vessel to insure the best possible taste. However, it is obvious that any frangible vessel such as a glass vessel is subject to breakage unless handled with great care at all times. This has been a decided deterrent to the use of glass vessels for coffee makers.

In Fig. 13 of the drawings there is illustrated a modification of Fig. 9 in which the advantages of a frangible coffee making vessel are retained without the disadvantages with respect to the fragility. As illustrated the corresponding parts of Fig. 13 are designated by the same reference numerals as in Fig. 9. The same lower vessel 11, preferably formed of glass which is a frangible material, is illustrated. However, the unit of assembly generally designated at 70' is slightly different from the unit of assembly 70 of Fig. 9 in that the body portion 71' thereof includes a cover portion 100, which is effectively a portion of a protective shell for enclosing the frangible vessel 11, and encloses a much greater portion of the glass vessel 11 than the portion 75 of Fig. 9. The cover portion 100 includes a shoulder portion 100a for conforming with the peripheral flange 15 and the rubber gasket 24 as is clearly shown in Fig. 13 of the drawings. The cover portion 100 further includes a flanged portion 100b which is threaded to receive a cooperating cup shaped shell portion 101, having a threaded portion 101a so as to engage the threaded portion of the cover 100 to define a shell for completely enclosing the exterior of the vessel 11.

Preferably the bottom of the member or shell portion 101 is provided with suitable leg portions 102 which might comprise an annular protrusion or a plurality of individual protrusions. A suitable resilient cushioning means 103 which might comprise a rubber pad or a coiled spring, as shown, cushions the base of the glass vessel 11 and also maintains the peripheral flange 15 in sealing engagement with the gasket 24, and the gasket 24 in turn against the shoulder 100a of the cover member 100. The resilient cushioning means 103 effectively shock proofs the frangible vessel 11 which furthermore might be termed an inner liner for the protective shell comprising the portions 100 and 101. The glass vessel 11 can readily be inserted into the bottom of the cover member 100 whereupon the cushioning means 103 and the member 101 are assembled in the manner shown. A predetermined space is maintained between the outer protective shell, comprising the members 100 and 101, and the vessel 11.

The cover member 100 may be formed of molded insulating material integral with the body portion 71 as may also the member 101. It should be understood, however, that the protective shell for the vessel 11 might also be formed of any suitable metal or other material.

In this way the coffee maker effectively comprises a glass vessel 11 for containing the coffee whereby the water may be heated in a glass vessel and at the same time a protective shell is provided therefor in a simple manner which protective shell may be designed to have a very pleasing appearance in addition to performing its function of completely protecting the glass vessel 11. With this construction the coffee maker may be handled in a rather careless manner without damaging the glass vessel and as a result the inherent disadvantage of the glass coffee maker is completely overcome while still retaining the desirable features thereof. The frangible vessel 11 which effectively is a glass liner can readily be replaced if for some unforeseen reason it is damaged. Furthermore, the unit of assembly 70' including the immersion heater 31 and control means associated therewith is admirably suited to be combined with the shock proof shell arrangement disclosed in Fig. 13.

While there have been illustrated and described certain particular embodiments of the present invention it will be understood that various changes and modifications of the invention will occur to those skilled in the art. It is aimed in the appended claims to cover all such changes and modifications as fall within the true spirit and scope of the present invention.

What is desired to be secured by Letters Patent of the United States is:

1. A coffee maker having, in combination, a coffee infusion vessel having a depending tube, an open-top vessel adapted for containing water to be heated, a unit of assembly detachably mounted on the water vessel, said unit providing a cover enclosing the open top of the water vessel and providing an opening for passage of said tube into the water vessel, said unit serving to seal the top of the water vessel so that water may be displaced from said water vessel to the infusion vessel through said tube in response to pressure generated within the water vessel, said unit equipped with an immersion heating element depending into the water vessel, a diaphragm within said unit responsive to pressure in the water vessel, an electric circuit for the heating element including a switch device within the unit coacting with said diaphragm, said heater circuit being closed for starting the coffee making operation so that heated water will be displaced to the infusion vessel in response to pressure within the water vessel, said diaphragm being responsive to said pressure in the water vessel and coacting with said switch to open the heating circuit after a maximum pressure has been reached in the water vessel incident to displacement of water therefrom in the coffee making operation and after the pressure has dropped below said maximum following said water displacement.

2. A coffee maker having, in combination, a coffee infusion vessel having a depending tube, an open-top vessel adapted for containing water to be heated, a unit of assembly detachably mounted on the water vessel, said unit of assembly providing a cover for the open top of said water vessel and providing an opening for insertion of said infusion vessel tube into the water vessel, an electric immersion heating element mounted on said unit and depending into the water vessel, control mechanism for said heating element carried by said unit including a switch for the heating element, a pressure responsive diaphragm, means providing communication between said diaphragm and the interior of the water vessel, and means coacting between the diaphragm and the switch to open the heating circuit after a maximum pressure has been reached in the water vessel incident to displacement of water therefrom in the coffee making operation and after the pressure has dropped below said maximum following said water displacement.

3. A coffee maker having, in combination, a coffee infusion vessel having a depending tube, an open-top vessel adapted for containing water to be heated, a unit of assembly detachably mounted on the water vessel, said unit of assembly comprising a cover part shaped to detachably fit the top portion of the water vessel to provide a cover for the open top thereof and to provide for insertion of said infusion vessel tube into the water vessel, a seal between said unit and the water vessel, and a second seal between the unit cover and the tubular portion of the infusion vessel, said unit including a casing of insulation material provided at one end with a handle and at its opposite end shaped for attachment to said cover portion and fixedly attached thereto, an electric immersion heating element mounted on said unit and depending into the water vessel, and control mechanism for said heating element carried by said unit including a pressure responsive diaphragm mounted within said casing, said unit having means providing communication between said diaphragm and the interior of the water vessel whereby the control for said heating element is actuated by said diaphragm in response to change in pressure within the water vessel.

4. A vacuum type coffee maker having, in combination, an open top lower vessel, an upper vessel having a tube adapted to depend into the lower vessel, means for relating said upper and lower vessels so that water heated in the lower vessel is displaced by pressure therein and forced through said tube to said upper vessel, the water vapor pressure in said lower vessel being sharply decreased upon the displacement of sufficient water from said lower vessel below the tube depending into the lower vessel an immersion heater for heating water in the lower vessel, a unit of assembly applied to the lower vessel for supporting the heater through the open top of the lower vessel, a switch supported by said assembly for controlling the energization of said heater, a mechanism supported by said assembly comprising an operating member movable from a first to a second position, pressure reversal responsive means responsive to a predetermined decrease in pressure in said lower vessel following the attainment of a predetermined maximum pressure therein for moving said operating member from said first to said second position, said last mentioned means comprising an element actuated directly in response to pressure in said vessel, and means relating said operating member and said switch so that said switch is opened in response to said predetermined decrease of pressure.

5. In a coffee making device, a pressure vessel, means to supply heat to said vessel, an electric circuit for energizing said means to supply heat to said vessel, a switch in said circuit comprising a pair of relatively moveable contacts, pressure reversal responsive means for moving both of said contacts as a unit while in contacting engagement in response to an increase in pressure in said pressure vessel, means for biasing one of said contacts in a direction to follow the movement of said pressure responsive means, and means for holding the other of said contacts in any position to which it is moved, whereby upon a decrease in pressure said one of said contacts moves away from the other of said contacts effectively to open said switch in response to a decrease of pressure in said vessel.

6. In a coffee making device, a pressure vessel, means to supply heat to said vessel, an electric circuit for energizing said means to supply heat to said vessel, a switch in said circuit comprising a pair of relatively moveable contacts each mounted upon a pivoted contact arm, pressure responsive means for moving both of said contact arms while said contacts are in contacting engagement in response to an increase in pressure in said pressure vessel, means for biasing one of said contact arms in a direction to follow the movement of said pressure responsive means, and friction means for holding the other of said contact arms in any position to which it is moved, whereby upon a decrease in pressure said one of said contacts moves away from the other of said contacts effectively to open said switch in response to a decrease of pressure in said vessel.

7. In a coffee making device, a pressure vessel, means to supply heat to said vessel, an electric circuit for energizing said means to supply heat to said vessel, a switch in said circuit comprising a pair of relatively moveable contacts each mounted upon a pivoted contact arm, pressure responsive means for moving both of said contact arms while said contacts are in contacting engagement in response to an increase in pressure in said pressure vessel, means for biasing one of said contact arms in a direction to follow the movement of said pressure responsive means, friction means for holding the other of said contact arms in any position to which it is moved, whereby upon a decrease in pressure said one of said contacts moves away from the other of said contacts effectively to open said switch in response to a decrease of pressure in said vessel, and manual means for moving said other of said contacts against the action of said friction means.

8. In a coffee making device, a pressure vessel, means to supply heat to said vessel, an electric circuit for energizing said means to supply heat to said vessel, a switch in said circuit comprising a pair of relatively moveable contacts, pressure responsive means for moving both of said contacts as a unit while in contacting engagement in response to an increase in pressure in said pressure vessel, means for biasing one of said contacts in a direction to follow the movement of said pressure responsive means, and friction means for holding the other of said contacts in any position to which it is moved, whereby upon a decrease in pressure said one of said contacts moves away from the other of said contacts effectively to open said switch in response to a decrease of pressure in said vessel.

9. In an automatic coffee maker of the type in which water vapor pressure generated by heating water in one chamber is used to expel the water through a tube into a coffee infusion chamber and the heating is then terminated to permit the water vapor to cool and condense and thus cause the coffee liquor to return to said one chamber, and in which the water vapor pressure is appreciably decreased in response to lowering of the water level in said one chamber to uncover the end of said tube disposed in said one chamber; the means for heating the water in said one chamber comprising a heating element, a circuit for energizing said heating element including switch means, a mechanism associated with said one chamber comprising an operating member movable from a first position to a second position, water vapor pressure reversal responsive means responsive to a predetermined decrease in pressure in said one chamber following the attainment of a maximum pressure for moving said operating member from said first position to said second position, said last mentioned means comprising an element actuated directly in response to pressure in said one chamber, and means relating said operating member and said switch means so that said switch means is operated to interrupt said energizing circuit in response to said predetermined decrease in pressure in said one chamber.

10. In an automatic coffee maker of the type in which water vapor pressure generated by heating water in one chamber is used to expel the water through a tube into a coffee infusion chamber and the heating is then terminated to permit the water vapor to cool and condense and thus cause the coffee liquor to return to said one chamber, and in which the water vapor pressure is appreciably decreased in response to lowering of the water level in said one chamber to uncover the end of said tube disposed in said one chamber; means for heating the water in said one chamber which comprises a heating element, a circuit for energizing said heating element, a switch means in said energizing circuit, a water vapor pressure reversal responsive device responsive to a predetermined decrease in pressure in said one chamber following the attainment of a predetermined maximum pressure, said device being actuated directly by variations in the water vapor pressure in said chamber and including a control element operative in a predetermined direction in direct response to said decrease in water vapor pressure in said one chamber, and means relating said switch means and control element to open said switch means in response to movement of said control element in said predetermined direction.

11. A coffee maker having, in combination, a coffee infusing vessel, a pressure vessel in which water is heated and from which it is displaced by pressure therein and passed to said coffee infusing vessel, and in which the water vapor pressure is sharply decreased in response to displacement of the water into said coffee infusing vessel, an electric heater for heating the water in the pressure vessel, a circuit for energizing said electric heater, a switch for controlling said circuit, a water vapor pressure reversal responsive device directly responsive to the water vapor pressure in said pressure vessel and including an element conditioned for operation from a first setting to a second setting in response to the water vapor pressure in said pressure vessel rising to a maximum, and operative from said first setting to said second setting in direct response to said sharp decrease in water vapor pressure in said vessel after said maximum pressure is attained, and means relating said device and said switch to interrupt said circuit in response to movement of said mechanism from said first setting to said second setting.

12. In a coffee making device, a pressure vessel, means to supply heat to said vessel, an electric circuit for energizing said heat supplying means, a switch in said circuit, a pressure reversal responsive mechanism operative from a first setting to a second setting in response to a predetermined decrease of pressure in said vessel following the attainment of maximum pressure therein, said mechanism comprising an element actuated directly in response to the pressure in said vessel, and means operatively relating said switch and said mechanism to open said switch in response to operation of said mechanism from said first setting to said second setting.

13. A coffee maker having, in combination, a coffee pressure vessel in which water is heated and from which it is displaced by pressure therein and passed to a coffee infusing vessel, an electric heater for heating the water in said pressure vessel, control means for controlling said electric heater, a pressure reversal responsive mechanism directly responsive to the pressure in said pressure vessel conditioned for operation from a first setting to a second setting in response to the pressure in said pressure vessel rising to a maximum, and operative from said first setting to said second setting in response to the pressure in said pressure vessel decreasing a predetermined amount after said maximum pressure is attained, and means for controlling said control means in response to movement of said mechanism from said first setting to said second setting.

IVAR JEPSON.

References Cited in the file of this patent

UNITED STATES PATENTS

| Number | Name | Date |
| --- | --- | --- |
| 1,704,191 | Heideman | Mar. 5, 1929 |
| 1,750,749 | Fonseca | Mar. 18, 1930 |
| 1,947,426 | Smith | Feb. 13, 1934 |
| 2,069,939 | Browning | Feb. 9, 1937 |
| 2,150,801 | Keaton | Mar. 14, 1939 |
| 2,164,158 | Masin | June 27, 1939 |
| 2,190,522 | Pagliuco | Feb. 13, 1940 |
| 2,196,393 | Ireland | Apr. 9, 1940 |
| 2,245,238 | Watson | June 10, 1941 |
| 2,269,111 | Jepson et al. | Jan. 6, 1942 |
| 2,287,580 | Wagner | June 23, 1942 |
| 2,287,584 | Weeks | Jan. 23, 1942 |
| 2,292,853 | Wilcox | Aug. 11, 1942 |
| 2,369,932 | Allen | Feb. 20, 1945 |

FOREIGN PATENTS

| Number | Country | Date |
| --- | --- | --- |
| 162,891 | Switzerland | Sept. 16, 1933 |
| 653,683 | Germany | Nov. 30, 1937 |